US010334870B2

(12) United States Patent
Han et al.

(10) Patent No.: US 10,334,870 B2
(45) Date of Patent: Jul. 2, 2019

(54) PROCESSING OF WHOLE FRUITS AND VEGETABLES, PROCESSING OF SIDE-STREAM INGREDIENTS OF FRUITS AND VEGETABLES, AND USE OF THE PROCESSED FRUITS AND VEGETABLES IN BEVERAGE AND FOOD PRODUCTS

(75) Inventors: Jung H. Han, Frisco, TX (US); Sola Lamikanra, Frisco, TX (US); Teodoro Rivera, Algonquin, IL (US); Jun Yang, Plano, TX (US); Thomas A. Trezza, Plano, TX (US); Laixin Wang, Plano, TX (US)

(73) Assignee: TROPICANA PRODUCTS, INC., Bradenton, FL (US)

( * ) Notice: Subject to any disclaimer, the term of this patent is extended or adjusted under 35 U.S.C. 154(b) by 399 days.

(21) Appl. No.: 13/249,289

(22) Filed: Sep. 30, 2011

(65) Prior Publication Data
US 2012/0088015 A1 Apr. 12, 2012

Related U.S. Application Data

(60) Provisional application No. 61/390,720, filed on Oct. 7, 2010.

(51) Int. Cl.
| | |
|---|---|
| A23L 2/02 | (2006.01) |
| A23L 2/04 | (2006.01) |
| A23L 2/39 | (2006.01) |
| A23L 19/00 | (2016.01) |
| A23L 33/15 | (2016.01) |
| A23L 33/21 | (2016.01) |

(52) U.S. Cl.
CPC .......... *A23L 2/02* (2013.01); *A23L 2/04* (2013.01); *A23L 2/39* (2013.01); *A23L 19/01* (2016.08); *A23L 33/15* (2016.08); *A23L 33/21* (2016.08)

(58) Field of Classification Search
CPC ................................. A23L 1/212; A23L 1/221
USPC ....... 426/231, 615, 616, 617, 629, 634, 638, 426/599, 598, 481, 650
See application file for complete search history.

(56) References Cited

U.S. PATENT DOCUMENTS

| | | | |
|---|---|---|---|
| 2,595,181 A | 4/1952 | Vincent | |
| 2,596,662 A | 5/1952 | Ducker | |
| 3,037,975 A | 6/1962 | Cohn | |
| 3,118,770 A | 1/1964 | Harrell | |
| 3,404,012 A * | 10/1968 | Craig | 426/384 |
| 3,860,734 A | 1/1975 | Huth | |
| 3,959,518 A | 5/1976 | Vincent | |
| 3,966,984 A | 6/1976 | Cooke | |
| 3,973,051 A | 8/1976 | Buckley | |
| 4,016,351 A | 4/1977 | Eschinasi | |
| 4,113,573 A | 9/1978 | Gerow | |
| 4,241,093 A | 12/1980 | Farag | |
| 4,259,252 A | 3/1981 | Perry | |
| 4,304,768 A | 12/1981 | Staub | |
| 4,313,372 A | 2/1982 | Gerow | |
| 4,377,520 A | 3/1983 | Howell | |
| 4,413,017 A | 11/1983 | Loader | |
| 4,488,912 A | 12/1984 | Milch | |
| 4,497,838 A | 2/1985 | Bonnell | |
| 4,503,079 A | 3/1985 | King | |
| 4,525,172 A | 6/1985 | Eriksson | |
| 4,526,794 A | 7/1985 | Altomare | |
| 4,565,702 A | 1/1986 | Morley | |
| 4,587,126 A | 5/1986 | Patton | |
| 4,644,905 A | 2/1987 | Vierling | |
| 4,690,827 A | 9/1987 | Kupper | |
| 4,747,881 A | 5/1988 | Shaw | |
| 4,774,099 A | 9/1988 | Feeney | |
| 4,810,517 A | 3/1989 | Glittenberg | |
| 4,830,862 A | 5/1989 | Braun | |
| 4,842,877 A | 6/1989 | Tyson | |
| 4,865,863 A | 9/1989 | Prosise | |
| 4,871,569 A | 10/1989 | Anderson | |
| 4,876,102 A | 10/1989 | Feeney | |
| 4,895,729 A * | 1/1990 | Powrie et al. | 426/316 |
| 4,925,686 A | 5/1990 | Kastin | |
| 4,952,504 A | 8/1990 | Pavilon | |
| 4,959,227 A | 9/1990 | Amer | |
| 4,971,823 A | 11/1990 | Fahlen | |
| 4,988,530 A | 1/1991 | Hoersten | |
| 5,007,334 A | 4/1991 | Kobes | |
| 5,008,254 A | 4/1991 | Weibel | |
| 5,024,996 A | 6/1991 | Ringe | |
| 5,034,378 A | 7/1991 | Cox | |

(Continued)

FOREIGN PATENT DOCUMENTS

| | | |
|---|---|---|
| CN | 1909805 | 2/2007 |
| CN | 101669550 A | 3/2010 |

(Continued)

OTHER PUBLICATIONS

PCT/US2011/054556, International Search Report and Written Opinion, dated Feb. 6, 2012.
Oct. 16, 2014—(CA) Office Action—App 2814059.
Bagherian et al., "Comparisons Between Conventional Microwave- and Ultrasound-Assisted Methods for Extraction of Pectin From Grapefruit," Chemical Engineering and Processing, vol. 50, 2011, pp. 1237-1243.
Bourquin, L.D., et al., Vegetable fiber fermentation by human fecal bacteria: Cell wall polysaccharide disappearance and short-chain fatty acid production during in vitro fermentation and water-holding capacity of unfermented residues. Journal of Nutr. 123: 860-869. (Abstract), 1993.

(Continued)

*Primary Examiner* — Michele L Jacobson
*Assistant Examiner* — Preston Smith
(74) *Attorney, Agent, or Firm* — Barnes & Thornburg LLP; G. Peter Nichols

(57) ABSTRACT

Processing and use of whole fruits and vegetables or side-stream ingredients of juice extraction, paste, or ketchup process, or canning industry, in particular, the processing of the by-products, including pomace, and its use in beverage and food products.

14 Claims, No Drawings

(56) References Cited

U.S. PATENT DOCUMENTS

| | | |
|---|---|---|
| 5,073,397 A | 12/1991 | Tarr |
| 5,099,009 A | 3/1992 | Thibault |
| 5,106,634 A * | 4/1992 | Thacker et al. ............... 426/31 |
| 5,137,744 A | 8/1992 | Cagley |
| 5,162,128 A | 11/1992 | Mills |
| 5,196,222 A * | 3/1993 | Kirk ............................ 426/482 |
| 5,202,122 A | 4/1993 | Graves |
| 5,232,726 A | 8/1993 | Clark |
| 5,234,704 A | 8/1993 | Devine |
| 5,260,086 A | 11/1993 | Downton et al. |
| 5,312,636 A * | 5/1994 | Myllymaki et al. ......... 426/417 |
| 5,385,748 A | 1/1995 | Bunger |
| 5,403,612 A | 4/1995 | Huang |
| 5,472,952 A | 12/1995 | Smidt |
| 5,474,793 A | 12/1995 | Meyer |
| 5,480,788 A | 1/1996 | Devic |
| 5,567,424 A | 10/1996 | Hastings |
| 5,567,462 A | 10/1996 | Ehrlich |
| 5,612,074 A | 3/1997 | Leach |
| 5,616,355 A | 4/1997 | Haast |
| 5,627,269 A | 5/1997 | Herak |
| 5,639,494 A | 6/1997 | Grassin |
| 5,656,310 A | 8/1997 | Santillo, Jr. |
| 5,690,981 A | 11/1997 | Watanabe |
| 5,738,887 A | 4/1998 | Wu |
| 5,759,704 A | 6/1998 | Horiuchi |
| 5,766,662 A | 6/1998 | Inglett |
| 5,773,075 A | 6/1998 | Todd |
| 5,817,381 A | 10/1998 | Chen |
| 5,837,311 A * | 11/1998 | Zelkha et al. ............... 426/651 |
| 5,861,178 A | 1/1999 | Burgin |
| 5,927,187 A * | 7/1999 | Bosch .................. B30B 9/06 100/116 |
| 5,932,265 A | 8/1999 | Morgan |
| 5,958,474 A | 9/1999 | Lee |
| 5,964,983 A | 10/1999 | Dinand |
| 6,019,851 A | 2/2000 | Pittet |
| 6,020,016 A | 2/2000 | Castleberry |
| 6,022,580 A | 2/2000 | Akatsuka |
| 6,083,582 A | 7/2000 | Chen |
| 6,151,799 A | 11/2000 | Jones |
| 6,183,806 B1 * | 2/2001 | Ficca et al. ................... 426/616 |
| 6,361,818 B2 | 3/2002 | Biyani |
| 6,383,546 B1 | 5/2002 | Powrie |
| 6,506,435 B1 | 1/2003 | Lundberg |
| 6,523,496 B1 | 2/2003 | Keithly |
| 6,645,546 B2 | 11/2003 | Roney |
| 6,730,343 B2 | 5/2004 | Chung |
| 6,753,019 B1 | 6/2004 | Lang |
| 6,787,172 B2 * | 9/2004 | McArdle et al. ............. 426/262 |
| 6,787,372 B1 | 9/2004 | McArdle et al. |
| 6,830,771 B2 | 12/2004 | Lanter |
| 6,841,181 B2 | 1/2005 | Jager |
| 6,890,578 B1 | 5/2005 | Takahasi |
| 7,052,725 B2 | 5/2006 | Chang |
| 7,060,313 B2 | 6/2006 | Jones |
| 7,074,300 B2 | 7/2006 | Lundberg |
| 7,094,317 B2 | 8/2006 | Lundberg |
| 7,485,332 B2 | 2/2009 | Chu |
| 7,560,132 B2 | 7/2009 | Newkirk |
| 7,563,471 B2 | 7/2009 | Keithly |
| 7,576,070 B2 | 8/2009 | Kunz |
| 7,582,213 B2 | 9/2009 | Lundberg |
| 7,629,010 B2 | 12/2009 | Passarelli |
| 7,629,011 B2 | 12/2009 | Suasin |
| 7,833,558 B2 | 11/2010 | Larsen |
| 7,879,379 B1 | 2/2011 | Widmer |
| 7,887,862 B2 | 2/2011 | Paz Briz |
| 7,910,338 B2 | 3/2011 | Hennessey |
| 8,017,171 B2 | 9/2011 | Sample |
| 8,021,520 B2 | 9/2011 | Yao |
| 8,034,286 B2 | 10/2011 | Janssen |
| 8,481,099 B2 | 7/2013 | Nafisi-Movaghar |
| 8,673,382 B2 | 3/2014 | Jordan |
| 2001/0012525 A1 | 8/2001 | Mann |
| 2001/0016220 A1 | 8/2001 | Jager |
| 2001/0046550 A1 | 11/2001 | Wadsworth |
| 2001/0053404 A1 | 12/2001 | William |
| 2002/0034563 A1 | 3/2002 | Grassin |
| 2002/0054924 A1 | 5/2002 | Leahy |
| 2002/0127319 A1 | 9/2002 | Gare |
| 2003/0040489 A1 | 2/2003 | Tanaka |
| 2003/0049360 A1 | 3/2003 | Zietlow |
| 2003/0064140 A1 | 4/2003 | Lineback |
| 2003/0068357 A1 | 4/2003 | Vala |
| 2003/0068429 A1 | 4/2003 | Frippiat |
| 2003/0144245 A1 | 7/2003 | Addis |
| 2003/0194473 A1 | 10/2003 | Redding |
| 2004/0022877 A1 | 2/2004 | Green |
| 2004/0081734 A1 | 4/2004 | Lang |
| 2004/0081741 A1 | 4/2004 | Levi |
| 2004/0086626 A1 | 5/2004 | Lundberg |
| 2004/0126474 A1 | 7/2004 | Letourneau |
| 2004/0170731 A1 | 9/2004 | Subramaniam |
| 2004/0213886 A1 | 10/2004 | Toves |
| 2004/0265451 A1 * | 12/2004 | Rooks et al. ................. 426/489 |
| 2004/0265465 A1 | 12/2004 | Daniels |
| 2005/0058763 A1 | 3/2005 | Cetrulo |
| 2005/0074542 A1 | 4/2005 | Lundberg |
| 2005/0089614 A1 | 4/2005 | Jones |
| 2005/0089620 A1 | 4/2005 | Bialek |
| 2005/0106308 A1 * | 5/2005 | Rudie et al. ................. 426/640 |
| 2005/0112242 A1 | 5/2005 | Hessel |
| 2005/0118233 A1 | 6/2005 | Segal |
| 2005/0118326 A1 | 6/2005 | Anfinsen |
| 2005/0158541 A1 | 7/2005 | Tanaka |
| 2005/0169970 A1 | 8/2005 | Aquino |
| 2005/0175672 A1 | 8/2005 | Kleutz |
| 2005/0202149 A1 | 9/2005 | McClements |
| 2005/0271790 A1 | 12/2005 | Aronson |
| 2005/0274469 A1 | 12/2005 | Lundberg |
| 2006/0062862 A1 | 3/2006 | Haber |
| 2006/0093720 A1 | 5/2006 | Tatz |
| 2006/0099277 A1 | 5/2006 | Jewett, Jr. |
| 2006/0115564 A1 | 6/2006 | Passarelli |
| 2006/0180547 A1 | 8/2006 | Widmer |
| 2006/0182820 A1 | 8/2006 | Kluetz |
| 2006/0188621 A1 | 8/2006 | Jones |
| 2006/0204624 A1 | 9/2006 | Patist |
| 2006/0210673 A1 | 9/2006 | Petrofsky |
| 2006/0210687 A1 | 9/2006 | Lundberg |
| 2006/0216397 A1 | 9/2006 | Kerkman |
| 2006/0240077 A1 | 10/2006 | Hansen |
| 2006/0251789 A1 | 11/2006 | Lundberg |
| 2006/0263416 A1 | 11/2006 | Brent |
| 2006/0263487 A1 | 11/2006 | Brent |
| 2006/0286260 A1 | 12/2006 | Nayak |
| 2007/0031572 A1 | 2/2007 | Larsen |
| 2007/0082026 A1 | 4/2007 | Aimutis |
| 2007/0082027 A1 | 4/2007 | Aimutis |
| 2007/0082028 A1 | 4/2007 | Aimutis |
| 2007/0082029 A1 | 4/2007 | Aimutis |
| 2007/0082030 A1 | 4/2007 | Aimutis |
| 2007/0082085 A1 | 4/2007 | Catani |
| 2007/0087084 A1 | 4/2007 | Coleman |
| 2007/0110684 A1 | 5/2007 | Jensen |
| 2007/0110875 A1 | 5/2007 | Keithly |
| 2007/0116837 A1 | 5/2007 | Prakash |
| 2007/0202211 A1 | 8/2007 | Altom |
| 2007/0298078 A1 | 12/2007 | Harrison |
| 2008/0014303 A1 | 1/2008 | Jacops |
| 2008/0020094 A1 | 1/2008 | Lager |
| 2008/0032015 A1 | 2/2008 | Walpole |
| 2008/0113079 A1 | 5/2008 | Takamine |
| 2008/0166464 A1 | 7/2008 | Lundberg |
| 2008/0193590 A1 | 8/2008 | Lundberg |
| 2008/0233238 A1 | 9/2008 | Roney |
| 2008/0248185 A1 | 10/2008 | Ferrari |
| 2008/0305096 A1 | 12/2008 | Verdegem |
| 2008/0311174 A1 | 12/2008 | Sakamoto |
| 2008/0311265 A1 | 12/2008 | MacDonald |
| 2008/0311272 A1 | 12/2008 | Wild |
| 2009/0011111 A1 | 1/2009 | Sugiura |
| 2009/0022877 A1 | 1/2009 | Sample |

(56) References Cited

U.S. PATENT DOCUMENTS

| | | | |
|---|---|---|---|
| 2009/0035441 A1* | 2/2009 | Hirashima et al. | 426/599 |
| 2009/0110798 A1 | 4/2009 | Gusek | |
| 2009/0123597 A1 | 5/2009 | Williams | |
| 2009/0130291 A1 | 5/2009 | Driggers | |
| 2009/0169680 A1 | 7/2009 | Rabault | |
| 2009/0186383 A1 | 7/2009 | Mancosky | |
| 2009/0215704 A1 | 8/2009 | Johnson | |
| 2009/0220665 A1 | 9/2009 | Vanhemelrijck | |
| 2009/0258111 A1 | 10/2009 | Takayanagi | |
| 2009/0269376 A1 | 10/2009 | Lundberg | |
| 2009/0274811 A1 | 11/2009 | Lundberg | |
| 2009/0297671 A1 | 12/2009 | Basker | |
| 2009/0297682 A1 | 12/2009 | Dukan | |
| 2010/0015302 A1 | 1/2010 | Bates | |
| 2010/0040728 A1 | 2/2010 | Henderson | |
| 2010/0086511 A1 | 4/2010 | Sakamoto | |
| 2010/0092620 A1 | 4/2010 | Bravo | |
| 2010/0099648 A1 | 4/2010 | Debon | |
| 2010/0159100 A1 | 6/2010 | Buysschaert | |
| 2010/0166913 A1 | 7/2010 | Stewart | |
| 2010/0233342 A1 | 9/2010 | Almeida | |
| 2010/0234569 A1 | 9/2010 | Helling | |
| 2010/0248320 A1 | 9/2010 | Lyons | |
| 2011/0020525 A1 | 1/2011 | Homsma | |
| 2011/0081336 A1 | 4/2011 | Medoff | |
| 2011/0086133 A1 | 4/2011 | Puranen | |
| 2011/0129591 A1 | 6/2011 | Jordan | |
| 2011/0151056 A1 | 6/2011 | Chukwu | |
| 2011/0223294 A1 | 9/2011 | Itoh | |
| 2011/0250314 A1 | 10/2011 | Lager | |
| 2011/0268860 A1 | 11/2011 | Lundberg | |
| 2011/0278153 A1 | 11/2011 | Bates | |
| 2011/0287151 A1 | 11/2011 | Simunovic | |
| 2011/0293814 A1 | 12/2011 | Alexandre | |
| 2011/0305808 A1 | 12/2011 | Sample | |
| 2011/0308141 A1 | 12/2011 | Christensen | |
| 2011/0311599 A1 | 12/2011 | Boursier | |
| 2011/0311708 A1 | 12/2011 | Wang | |
| 2012/0016026 A1 | 1/2012 | Bromley | |
| 2012/0037013 A1 | 2/2012 | Bertocchi | |
| 2012/0040068 A1 | 2/2012 | Eveland | |
| 2012/0040073 A1 | 2/2012 | Fox | |
| 2012/0088015 A1 | 4/2012 | Han et al. | |
| 2012/0135124 A1 | 5/2012 | Letourneau | |
| 2013/0064947 A1 | 3/2013 | Nafisi-Movaghar | |
| 2013/0123374 A1 | 5/2013 | Gusek | |
| 2014/0234476 A1 | 8/2014 | Balasubramanian | |
| 2014/0308389 A1 | 10/2014 | Ames | |
| 2016/0000130 A1 | 1/2016 | Balasubramanian | |

FOREIGN PATENT DOCUMENTS

| | | | |
|---|---|---|---|
| CN | 101715947 | | 6/2010 |
| EP | 0061305 | | 9/1982 |
| EP | 0485030 | | 5/1992 |
| EP | 2624710 | A1 | 8/2013 |
| FR | 2712464 | | 11/1993 |
| GB | 635053 | | 4/1950 |
| GB | 1045243 | A | 10/1966 |
| GB | 1341963 | | 12/1973 |
| JP | 5898055 | | 6/1983 |
| JP | 3146593 | | 6/1991 |
| JP | H06335371 | | 6/1994 |
| JP | 10210956 | | 8/1998 |
| JP | 2001128637 | | 5/2001 |
| JP | 2004261039 | | 9/2004 |
| KR | 20120010680 | A | 2/2012 |
| RU | 2202257 | | 4/2003 |
| RU | 2342854 | | 1/2009 |
| WO | 199427451 | | 12/1994 |
| WO | 199903892 | | 1/1999 |
| WO | 200005310 | | 2/2000 |
| WO | 2000013532 | | 3/2000 |
| WO | 2001032978 | | 5/2001 |
| WO | 2001078859 | | 10/2001 |
| WO | 2001084965 | | 11/2001 |
| WO | 2004008881 | | 1/2004 |
| WO | 2004044285 | | 5/2004 |
| WO | 2004085484 | A1 | 10/2004 |
| WO | 2005087200 | A1 | 9/2005 |
| WO | 2006096884 | A2 | 9/2006 |
| WO | 2007092087 | | 8/2007 |
| WO | 2007092448 | | 8/2007 |
| WO | 2007139563 | | 12/2007 |
| WO | 2008068572 | A2 | 6/2008 |
| WO | 2008077594 | | 7/2008 |
| WO | 2008089821 | | 7/2008 |
| WO | 2008095254 | | 8/2008 |
| WO | 2008104779 | | 9/2008 |
| WO | 2008112957 | | 9/2008 |
| WO | WO 2008/104779 | * | 9/2008 |
| WO | 2008134626 | | 11/2008 |
| WO | 2009013395 | | 1/2009 |
| WO | 2010010219 | | 1/2010 |
| WO | 2010084240 | | 7/2010 |
| WO | 2010093864 | | 8/2010 |
| WO | 2011024183 | | 3/2011 |
| WO | 2012016201 | A2 | 2/2012 |
| WO | 2012045045 | | 4/2012 |
| WO | 2012047786 | A1 | 4/2012 |
| WO | 2015146880 | A1 | 1/2015 |

OTHER PUBLICATIONS

Corey et al. "Witloof Chicory: A New Vegetable Crop in the United States" 1990 Advances in New Crops Timber Press pp. 414-418 Accessed from http://www.hort.purdue.edu/newcrop/proceedings1990/v1-414.html pp. 1-8.

Dongowski, G., et al., The degree of methylation influences the degradation of pectin in the intestinal tract of rats and in vitro. J. Nutr. 132: 1935-1944. (Abstract), 2002.

Endress, Hans Ulrich, et al, In Fiber ingredients: Food applications and health benefits. Susan Sung Cho and Priscilla Samuels, eds. CRC Press Francis Taylor Group, Boca Raton FL. (Summary), 2009.

Fishman, M.L., et al., Component and global average radii of gyration of pectins from various sources. Carbohydrate Polymers 15: 89-104, 1991.

Gibson, G.R., et al., Dietary modulation of the colonic microbiota: Introducing the concept of prebiotics. J. Nutr. 125: 1401-1412, 1995.

Gibson, G.R., et al., "Handbook of Prebiotics" CRC Press Taylor & Francis Group. Boca Raton, FL. (Table of Contents), 2008.

Grootaert, C., et al., Microbial metabolism and prebiotic potentcy of arabinoxylan oligosaccharides in the human intestine. Trends in Food Science & Technology. 18(2): 64-71. (Abstract), 2007.

Gulfi, M., et al, Influence of structure on in vitro fermentability of commerical pectins and partially hydrolysed pectin preparations. Carbohydrate Polymers 59: 247-255, 2005.

Gulfi, M., et al., The Chemical characteristics of apple pectin influence its fermentability in vitro. LWT 39: 1001-1004, 2006.

Gulfi, M., et al., In vitro fermentability of a pectin fraction rich in hairy regions. Carbohydrate Polymers, 67: 410-416, 2006.

Hellin et al., "Changes in High and Low Molecular Weight Carbohydrates During Rhizopus Nigricans Cultivation on Lemon Peel," Carbohydrate Polymers, vol. 45, 2001, pp. 169-174.

Hotchkiss, A.,et al., New bioactive and biobased product applications of pectin. In Pectins and Pectinases, Schols et al. editors. Wageningen Academic Publisher, Wageningen, The Netherlands (Summary and Abstract), 2009.

International Search Report and Written Opinion in PCT/US10/57778, dated Mar. 2, 2011.

International Search Report and Written Opinion in PCT/US15/14850 dated Jun. 25, 2015.

International Search Report and Written Opinion in PCT/US11/62303 dated Apr. 5, 2012.

International Search Report and Written Opinion in PCT/US14/15326 dated May 9, 2014.

(56) References Cited

OTHER PUBLICATIONS

"Isolate" Merriam-Webster.com. Merriam-Webster, n.d. Web., Mar. 27, 2014. http://www.merriam-webster.com/dictionary/isolate 2 pages.
Khan, M.K. et al, Ultrasound-assisted extraction of polyphenols (flavanone glycosides from orange (*Citrus sinensis* L.) peel. Food Chemistry, 119, 851-858. (Abstract).
Manderson, K., et al, In vitro determination of prebiotic properties of oligosaccharides derived from an orange juice manufactoring by-product stream. Applied and environmental microbology. 71(12):8383-8389, 2005.
Nicolini, L., Changes in in-vitro digestibillity of orange peels and distillery grape stalks after solid-state fermentation by higher fungi. Bioresource Technology 45(1): 17-20 (Abstract), 1993.
Olano-Martin, E., et al, Comparison of the in vitro bifidogenic properties of pectins and pectic-oligosaccharides. J Appl Microbiol 93: 505-511, 2002.
Roth, J.A., et al, Pectin improves colonic function in rat short bowel syndrome. Journal of surgical research 58: 240-246. (Abstract), 1995.
Salyers, A. A., et al, Fermentation of mucins and plant polysaccharides by anaerobic bacteria from the human colon. Applied and Environmental Microbiology. 1977: 529-533 (Abstract).
Sunvold, G.D., et al., In vitro fermentation of cellulose, beet pulp, citrus pulp, and citrus pectin using fecal inoculum from cats, dogs, horses, humans, and pigs and ruminal fluid from cattle. J Anim Sci 1995. 73:3639-3648, 1995.
Titgemeyer, E.C., et al, Fermentability of various fiber sources by human fecal bacteria in vitro. Am J of Clinical Nutr 53:1418-1424. (Abstract), 1991.
Tripodo, M.M., et al, Citrus waste recovery: a new environmentally friendly procedure to obtain animal feed. Bioresource Technology 91(2): 111-115. (Abstract), 2004.
"Understanding Mesh Sizes and Microns", www.skylighter.com/fireworks/making-fireworks-projects/screen-mess-metal-particl . . . May 31, 2013. , p. 1.
Van Den Broek, L.A.M., Voragen, A.G.J., 2008. Bifidobacterium glycoside hydrolases and (potential) prebiotics. 2008. Innovative Food Science & Emerging Technologies 9: 401-407. (Abstract and Industrial Relevance).
Veldius, M.K., et al., Oil- and water-soluble aromatics distilled from citrus fruit and processing waste J. of Food Science 37: 108-112. (p. 108), 1972.
Will, et al., "Processing and Analytical Characterisation of Pulp-Enriched Cloudy Apple Juices," Elsevier, LWT—Food Science and Technology, vol. 41, No. 10, 2008, pp. 2057-2063.
Yamada, H., et al, Recent studies on structures and intestinal immunity modulating activities of pectins and pectic polysaccharides from medicinal herbs. In Pectins and Pectinases, Schols et al. editors. Wageningnen Academic Publisher, Wageningen, The Netherlands. (Abstract), 2009.
Hayat, Khizar, "Effect of microwave treatment on phenolic content and antioxidant activity of citrus mandarin pomace," Food Chemistry 123 (2010) 423-429, XP027086084, (7 pages).
Panquin: "Funcitional and Speciality Beverage Technology"; Elsevier, Jan. 29, 2009, Technology & Engineering—(512 pages).
Rockenbach, Ismael Ivan, "Phenolic compounds content and antioxidant activity in pomace from selected red gapes (*Vitis vinifera* L. and *Vitis labrusca* L.) widely produced in Brazil," Food Chemistry 127 (2011) 174-179, XP028361805 (6 pages).
Stoll, T. et al. 2003. Food, Argic and Environ. 1: 88-92, Year 2003, (4 pages).
Stoll, T. et al. 2003. Inv Food Sci. Emg. Technol. 4:415-423, Year 2003, (9 pages).

\* cited by examiner

PROCESSING OF WHOLE FRUITS AND VEGETABLES, PROCESSING OF SIDE-STREAM INGREDIENTS OF FRUITS AND VEGETABLES, AND USE OF THE PROCESSED FRUITS AND VEGETABLES IN BEVERAGE AND FOOD PRODUCTS

The application claims priority to U.S. provisional application Ser. No. 61/390,720 filed Oct. 7, 2010, hereby incorporated by reference in its entirety.

FIELD OF THE INVENTION

The invention relates to processing and use of whole fruits and vegetables and to processing of side-stream ingredients of juice extraction and paste production. More particularly, the invention relates to methods of reducing the particle size of whole fruits and vegetables or side-stream ingredients thereof. The invention further relates to use of the processed whole fruits and vegetables and use of the processed side-stream ingredients in beverage and food products.

BACKGROUND OF THE INVENTION

Whole vegetables and fruits are generally not used in beverages as they contain ingredients such as skins, seeds, stems, roots, and the like which may affect the taste and mouthfeel of the beverage. Instead, juices and/or pulp are obtained from the vegetables and fruits and the skins, seeds, stems, roots, and the like are discarded. These discarded ingredients are often in the form of pomace.

Pomace is the pulpy edible by-product remaining after fruit or vegetable juice pressing processes, wine crush operations, puree and concentrate operations, canning processes, and other food manufacturing processes. Pomace may include, for example, skins, pulp, seeds, and edible part of stems of the fruit and vegetable such as apples or carrots. In some cases the pomace can derive or contain other parts of the fruit and vegetable such as pod, stalk, flower, root, leaves and tuber. In a juice extraction process, the pomace is typically in the form of a part of press cake. By-products from paste and puree processes such as tomato skins and seeds from tomato ketchup and paste processing are also included in the pomace even they are not the by-products from juice extracts. Fruit skins from cannery are also edible by-products. Hereafter, pomace includes all edible by-products from fruit and vegetable juice, paste, puree and canning processes.

Pomace has been used for fertilizer and substrates for microorganism growth, for example, and dried pomace has had limited use in food products such as soups and snacks, and also has been used in the dietary supplement industry. However, pomace is generally not used in food products due to its gritty texture, sedimentation, fibrous nature, high insoluble fiber content, intense flavor and lack of starch and protein. Thus pomace is generally considered a waste by-product in the fruit and vegetable industry.

For example, cranberry pomace remains after the squeezing of juice for cranberry type cocktails and juices and concentrates. These cranberry pomace materials have been found to contain 70% to 75% fiber with in insoluble to soluble fiber ratio of 9 or 10 to 1 (wet basis) less than 5%-10% protein, and less that 5% sugars and starches. Thus, by-products are typically removed from the juicing process due to challenges with texture and flavor when creating a juice beverage.

It would be beneficial to process pomace as well as whole fruits and vegetables to arrive at a useful food ingredient in order to avoid such waste.

BRIEF SUMMARY OF THE INVENTION

In one aspect, the invention relates to whole fruits and vegetables which have been processed to provide a product having particle and fiber size less than 250 microns and their use in beverage and food products.

In another aspect, the invention relates to a method of processing whole fruits and vegetables to provide a product having particle and fiber size less than 250 microns to improve texture and dispersion properties.

In another aspect, the invention relates to side-stream ingredients (pomace) having particle and fiber size less than 250 microns and its use in beverage and food products.

In another aspect, the invention relates to a method of reducing the particle and fiber particle size of pomace to less than 250 microns to improve texture and dispersion properties.

In another aspect, the invention relates to a method of reducing the particle and fiber size of pomace wherein the pomace is hydrated and frozen prior to micro-grinding.

In another aspect, the invention relates to pre-treating the whole fruits and vegetables or pomace with heat prior to AOAC fiber analysis to maximize fiber detection.

DETAILED DESCRIPTION OF THE INVENTION

Side-stream ingredients (hereinafter "pomace") generally contains high total dietary fiber content (50 or more percent by weight), low amounts of in sugars typically less than 5% but more commonly less than 2% by weight in wet pomace, and varying amounts of essential vitamins, minerals and phytonutrients (depending on types of fruit/vegetable and process applied). Likewise, whole fruits and vegetables also contain fiber and nutrient content much higher than the extracted juice products and thus are much healthier.

Whole Fruits and Vegetables

Whole vegetables and fruits include juices, pulp, skins, seeds, roots, and the like. Aspects of the invention utilize the entire vegetable or fruit to prepare a product for consumption either alone or in combination with other ingredients. In accordance with the present invention, the desired product has a reduced particle size of less than 250 microns. The whole fruits and vegetables are pre-treated prior to size reduction by, for example, crushing, cutting, pulverizing, or homogenizing to form an intermediate product. This intermediate product is then subjected to particle (including fiber) size reduction as discussed in more detail below.

Prior to particle size reduction, the intermediate product may be acidified to lower the pH. Typically the product is acidified to under pH 4.5 for microbial stability. Sufficient amounts of organic acids such as citric acid, lactic acid, acetic acid, malic acid, succinic acid, or juices such as lemon juice and/or acidic juice concentrate may be added to the product to reduce the pH of product to a desired pH.

Whole fruits and vegetables any be any suitable fruit or vegetable such as, but not limited to, carrot, cranberry, orange, blueberry, tomato, apple, and any combination thereof. Lemons, limes, grapes, strawberries, grapefruits, tangerine, mandarin orange, tangelo, pomelo, celery, beet, lettuce, spinach, cabbage, artichoke, broccoli, brussels sprouts, cauliflower, watercress, peas, beans, lentils, asparagus, onions, leeks, kohlrabi, radish, turnip, rutabaga, rhubarb, carrot, cucumber, zucchini, eggplant, pineapple, peach, banana, pear, guava, apricot, watermelon, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, rowan, gooseberry, pomegranate, persimmon, mango, papaya, lychee, plum, prune, fig, or their combination.

Pomace (Side-Stream Ingredients)

Pomace a natural by-product from the extraction of juices from fruits and vegetables and other processes. Pomace contains natural nutrients (such as vitamin A, vitamin C, vitamin E, anthocyanins, and antioxidants), flavors, and/or colors of the original fruits and vegetables. Pomace also contains high natural (un-processed) fibers. Most pomace contains over 50% (d.b.) of dietary fiber, mostly insoluble fiber. The use of pomace in food products will fortify fiber and naturally existing nutrients such as vitamins and antioxidants. Hence the use of pomace provides an excellent natural and label-friendly way to enhance quality of food products including, for example, beverages, soups, spreads, puddings, smoothies and snacks. Moreover, pomace is generally a low cost ingredient because it is under-utilized and is considered a waste from juice industry.

Pomace may be obtained from any suitable fruit or vegetable such as, but not limited to, carrot, cranberry, orange, blueberry, tomato, apple, and any combination thereof. Lemons, limes, grapes, strawberries, grapefruits, tangerine, mandarin orange, tangelo, pomelo, celery, beet, lettuce, spinach, cabbage, artichoke, broccoli, brussels sprouts, cauliflower, watercress, peas, beans, lentils, asparagus, onions, leeks, kohlrabi, radish, turnip, rutabaga, rhubarb, carrot, cucumber, zucchini, eggplant, pineapple, peach, banana, pear, guava, apricot, watermelon, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, rowan, gooseberry, pomegranate, persimmon, mango, papaya, lychee, plum, prune, fig, or their combination. In particular, pomace obtained from orange, cranberry, and carrot provides valuable nutrients and fiber.

Pomace may be obtained from any processing method that produces side-stream ingredients. For example pomace may be obtained and used as is from the press cake after a juice extraction process; however, such pomace generally has a wide range of particle and fiber sizes with a significant amount being large particles. For example, particle or fiber sizes of pomace may range from 100 microns to 5 cm depending upon the particular type of extracted fruit or vegetable. Pomace containing larger particles and fiber, and/or a wide distribution of particle or fiber sizes does not have a smooth texture. Therefore, mixing such pomace into beverage or snack formulations provides a tough, sandy, and gritty texture. Such pomace also causes a non-homogeneous dispersion in liquid-based products. For ease of discussion, the term "particle size" refers to both particle size and fiber size.

As used herein, pomace may also include the "goo" or the retentate formed from a filtration step of an extraction process, e.g., when clarifying a juice. This filtration retentate may be obtained as a by-product, for example, from any suitable fruit or vegetable juice such as carrot or cranberry juices. This retentate or goo may be added to pomace obtained from the press cake, for example, and is hereinafter is collectively referred to as pomace. Pomace (including filtration retentate) "as is" provides fiber, color, nutrients, mouthfeel, flavor.

It was discovered that the pomace may be treated to reduce the particle (including fiber) size resulting in improved texture and dispersion capability of the pomace in a product. It was further discovered that upon size reduction, the ratio of soluble portions of the pomace to insoluble portions increases, more flavors and colors are released, and the texture of the particles feels smoother.

Any suitable form of pomace such as wet pomace, frozen pomace, or dry pomace may be used to obtain the desired product. Wet or frozen pomace does not require rehydration. Dry pomace is lighter and easier to store. Wet pomace may be taken directly as the press cake. The moisture content of the pomace depends on the fruit or vegetable they may vary on moisture content. There are various methods to dry pomace if desired, for example on a commercial scale a continuous forced air indirect fire oven may be used.

The pH of the pomace may range from 2 to 7. Prior to particle size reduction, the pomace may be acidified to lower the pH. Typically the pomace is acidified to under pH 4.5 for microbial stability. Sufficient amounts of organic acids such as citric acid, lactic acid, acetic acid, malic acid, succinic acid, or juices such as lemon juice and/or acidic juice concentrate may be added to the pomace to reduce the pH of pomace to a desired pH.

Processing of Whole Fruits and Vegetables and/or Pomace

In accordance with one aspect, the whole fruits or vegetables intermediate product obtained by pre-treating the whole fruits or vegetables as discussed above or pomace material is subjected to a size-reduction process. Size reduction may occur through any suitable mechanical or chemical process such as micro-grinding, cutting, shredding, slicing, grinding, shearing, extruding, homogenizing, pulverizing, comminuting, or subjecting to ultrasonic frequency. In one aspect, the size reduction is achieved by micro-grinding.

Micro-grinding process is typically used for pureeing portions of fruits and vegetables such as fruits and vegetables wherein the skin, seeds, etc. are removed, but has not heretofore been known to reduce the size of whole fruits and vegetables or of pomace.

This process comprises feeding, grinding, and mesh-screening or filtering processes in a unit operation. Therefore, the outcome has more controlled and homogeneous size distribution than random grinding without mesh-screening process. The micro-grinding process provides a product which is very suitable for addition to food products, and in particular beverage products to provide high nutritional value. For further size reduction, the micro-ground product is, optionally, passed through pressurized homogenizers such as dairy or dipping sauce homogenizers. The micro-ground product can be incorporated in wet form or dehydrated to appropriate moisture level prior to use in product formulation.

Ideally, the particle size of the whole fruits and vegetables or pomace is reduced to at least below 250 microns to provide a micro-ground product with a smooth texture and dispersibility, while below 125 micron is recommended for the better sensory result. In some examples, the particle size may be reduced to below 75 micron or below 38 micron. The range of 38 micron to 125 micron particularly improves both dispersion and mouthfeel characteristics in beverages. Micro-grinding also increases: (1) total fiber content; and (2) the ratio of soluble fiber to insoluble fiber. This indicates that the mechanical grinding method partially converts: (1) nondetectable fiber to detectable by AOAC method; and (2) insoluble fiber to soluble fiber. See Example 2 below.

In another aspect of the invention, pomace is prepared for freeze-shearing by adding water to the pomace. The amount of water depends on the type of pomace. For example, cranberry pomace requires a 20:1 water:pomace ratio whereas blueberry pomace requires a 10:1 water to pomace ratio. The amount of water necessary to prepare the pomace for freeze shearing is easily determined by following the process outlined below in the examples. Essentially, sufficient water is added to form and maintain a vortex in a Vitamix or other suitable blender for about 5 minutes. When frozen, such hydrated pomace provides an ideal substrate for freeze shearing.

The mixture is then frozen at 0 to −20° C., for example −9° C., until suitably frozen, typically 12-20 hours. The frozen puree is then subjected to at least one cycle of shearing such as with the Pacojet shearing process. The result is a smooth frozen puree which, when eaten, exhibits little or no grittiness experienced with the untreated puree/slurry.

Upon thawing at room temperature, a smooth, thick puree with the consistency of dairy pudding can be obtained. The continuous hydration and shear of the pomace increases viscosity and film forming ability. The unexpected result indicates shear and hydration can be used to slightly modify fruit fiber to create a useful food ingredient.

Before or after size reduction, components that provide off-tastes may be removed from the fruit or vegetable intermediate product or from the pomace. The components (e.g. bitter nutrients such as certain phytonutrients for example) may be left in the fruits and vegetables or pomace, or may be removed before or after particle size reduction through steam-stripping or blenching, or some type of filtration such as micro, ultra, nano filtration or reverse osmosis and then replaced (e.g. after encapsulation via a typical shell and core or even replaced through an emulsion system or some other process to overcome the off-taste). Steam stripping or blenching can also eliminate undesirable enzymatic reactions including enzymatic browning, and also initial load of microorganisms.

If pH adjustment had not been made prior in the process (before particle size reduction) then sufficient amounts of organic acids such as citric acid, lactic acid, acetic acid, malic acid, succinic acid, or juices such as lemon juice and/or acidic juice concentrate may be added to the size-reduced product to reduce the pH as desired.

The size-reduced fruit or vegetable or pomace product may then be used to prepare a beverage or food product. If necessary, the micro-ground product may be subjected to partial dehydration to remove some of the moisture. The resulting products are combined with base juices to form a beverage formulation which optionally may be homogenized and then pasteurized.

The size-reduced fruit or vegetable or pomace product may be used as main ingredients of fruit and vegetable food products or may be included in various food products to provide enhanced nutrition and other characteristics, such as color, flavor, and mouthfeel. Suitable food products include, but are not limited to beverages, soups, spreads, puddings, smoothies, snack foods, yogurts, and cereals.

The size-reduced fruit or vegetable or pomace product may be added to products that usually contain little or no real fruit, such as gummy snacks that contain less than 2% fruit, or multiphase snacks with a jam filling that is mostly non-fruit ingredients such as fillings for toaster tarts and the like. The size-reduced fruit or vegetable or pomace product may be used as a substitute for a combination of fruit juice or juice concentrate with a thickener (gum) because it can provide both fruit benefits and viscosity.

The size-reduced fruit or vegetable or pomace product may be added to various types of beverages such as fruit and or vegetable juices, fruit smoothies, fruit beverages and fruit cocktails. This will enhance natural fiber and phytochemical contents and increase viscosity, smoothness and mouth filling.

The following table demonstrates the benefit of added pomace (or goo) to various base juices.

| Base-Juice | Enhanced Nutrients | Pomace/Goo | pH of final product |
|---|---|---|---|
| 100% Orange | 2.5 g fiber/serving | Orange Pomace 38 μm | 3.8 |
| Orange Carrot | 100% Vitamin A/serving | Carrot Goo | 3.8 |
| Orange Carrot | 2.5 g fiber/serving + 100% Vitamin A/serving | Carrot Pomace 125 μm (acidified w/Lemon Juice conc.) | 3.8 |
| Red/Apple | 2.5 g fiber/serving | Cranberry Goo | 3.5 |
| Red/Apple | 2.5 g fiber/serving | Cranberry Skin 125 μm | 3.4 |
| Red/Apple | 2.5 g fiber/serving | Cranberry Skin 38 μm | 3.0 |

As shown in the following table, pomace ingredients (without treatment) are generally higher molecular weight and less soluble and dispersible than FIBERSOL-2 a modified corn starch by ADM or other common sources of fiber. However, treating pomace as described herein to reduce the particle size provides pomace having increased solubility and greater nutritional value.

| Name | Chemical Composition | Soluble to Insoluble | Total Fiber | Other nutrients |
|---|---|---|---|---|
| Fibersol | Resistant Maltodextrin α and b glycoside linkage | 2:1 | 100% | |
| Inulin | β-(2-1) fructosyl-fructose links | Soluble | 100% | |
| Pectin from Citrus | α-(1-4)-linked D-galacturonicacid | Soluble | 100% | |
| β-Glucan | D-glucose linked by β-glycosidicbonds | Short: soluble Long: insoluble | 75.1% (oat) | |
| Cranberry Pomace | Mainly β -(1-4) glucoside | 1:10 | 72.4% | Proanthocyanins |
| Cranberry Goo | Mainly β -(1-4) glucoside | 1:5 | 43% | Anthocyanins |
| Carrot Pomace | β -(1-4) glucoside, α -(1-4) galacturonic acid | 1:1 | 52.8% | Carotenoids Minerals |
| Orange Pomace | α -(1-4) galacturonic acid, β -(1-4) glucoside | 1:2 | 54% | Carotenoids, saponins, limonin |

Dietary fiber comprises the remnants of edible plants cells, polysaccharides, lignin, and associate substances (carbohydrates) resistant to (hydrolysis) digestion by alimentary enzymes of humans.

AOAC fiber analysis is used to detect the amount of fiber in a food ingredient. This is important so that the amount of dietary fiber may be accurately reported in an ingredient/ nutritional content disclosure. In another aspect of the invention, the pomace is pre-heated to inactivate natural enzymes present in the fruits or vegetables ingredients present in the pomace. The pomace is pre-heated to a temperature of at least about 70° C., to about 100° C. The pre-heating occurs prior to AOAC fiber analysis to maximize the fiber detection. It was discovered that such pre-heating treatment results in increasing the measured fiber content of the material and modifying the structure of the fiber. The heating may be done prior to particle size reduction, afterwards, both, or neither.

Example 1

Orange juice (200 g), carrot pomace treated to reduce the particle size (43 g), lemon Juice (2 g), and carrot goo (1 g) were combined to form a juice product. The resulting juice product had the following nutritional characteristics based on an 8 oz serving. Calories: 100; Total Fat: 0 g; Cholesterol 0 mg; Total Carb 25 g (Dietary Fiber 3 g; Sugars 20 g); Vitamin A: 220%; Vitamin C: 100%.

Example 2

Wet orange pomace was used in various forms to compare measured fiber. AOAC method 991.43; All results are listed in dry basis.

| Sample | Total Fiber (%) | Soluble Fiber (%) | Insoluble Fiber (%) |
|---|---|---|---|
| Wet Pomace | | | |
| Raw Micro-Ground Pomace | 15 | 6.9 | 7.7 |
| 125 micron | 27 | 12.1 | 14.7 |
| 75 micron | 28 | 12.5 | 15.7 |
| 38 micron | 37 | 21.7 | 15.1 |
| Dried Pomace | | | |
| Heated + Freeze Dried | 54 | 35.5 | 18.4 |

Example 3

Two samples of orange pomace were subjected to AOAC analysis. Oranges were peeled and then juiced in an electric juicer. The resulting pomace was washed with water. The first sample (control) had no heat treatment. The second sample was heated for 5 minutes in boiling water and then drained. Both samples were freeze dried. Fiber and pectin analysis was conducted on the sample solids.

| | TDF (%) | Soluble Fiber (%) | Insoluble Fiber (%) | Pectin (mg/100 g) |
|---|---|---|---|---|
| Control | 33 | 11.4 | 21.3 | 3244 |
| Heat-Treated | 46 | 15.7 | 30.0 | 4574 |

It was concluded that inactivation of naturally existing enzymes (including pectinase) by heating increases fiber content.

Example 4

Four gallons of cranberry fine pomace were mixed with cranberry juice. One part of this material was mixed with four parts concentrated juice and water (16 gallons). The resulting slurry was subjected to three steps of reduction. Step one used the 212084-1 microcut head for 125 micron product which step produced about 4" of "foam" on top of the cranberry liquid. The result indicated a good reduction of fine cranberry pulp with cranberry "skins".

Step two further processed the step one product into a 21608-1 microcut head for 75 micron product. Not much foam was produced in step two. The result indicated a good further reduction of cranberry pulp was accomplished in this step.

Step three further processed the step two product through a 216084 microcut head for 35 micron product. Almost no foam was produced in the last step. The result indicated a good final reduction of cranberry pulp in cranberry juice/water.

Example 5

Fruit and vegetable pomace was reduced to as small as possible without having to add extra juice. Orange pulp was cut into 2" pieces so that the pieces could be fed into a cutting head for further reduction. There was a very good reduction of the 2" sized cubes of orange pulp into free flow 0.090" pieces of orange pulp. This material fed easily into a microcut impeller having a 212084-1 microcut head. The resulting reduced orange juice pulp mixed well with water.

The carrot pulp was too thick as received. One part carrot juice (by weight) was added to one part carrot pulp and mixed well so that the material could go into the 216084-1 microcut head 35 micon. Moisture content (M.C.) 87.15%. There was a very good further reduction of carrot slurry into a fine puree which floated in water.

Example 6

Cranberry pulp (skin and seeds) was mixed with 1 part cranberry juice to 1 part pulp and mixed well. The M.C. was 55.11%. The 1:1 cranberry pulp slurry was reduced in the 200084-2° microcut head and produced a dry ribbon of pulp. This ribbon extrusion is due to the cranberry seeds being reduced. More liquid or juice was added to this product to go into the next reduction step. Three parts of juice was added to make the input material 3:1 or 62.9% M.C.

The second step of reduction on the 3:1 cranberry slurry was successful. An additional trickle of water was needed to avoid a pause in the feeding of the cranberry pulp slurry which would result in high temperature in the microcut cutting zone and steam being released from the material being cut.

Because the material that goes into the 216084 microcut head should be pourable, water was added to the cranberry pulp slurry to make it a 5:1 slurry with 76.66% M.C. The 5 parts liquid to 1 part cranberry pulp was sufficient to reduce the cranberry pulp to as fine as could be produced. Some of the pulp floated and some sank to the bottom of the container.

Example 7

A fine particle size fiber by dry grinding was created that reduces negative texture in foods and beverages. About 200 grams each of cranberry and blueberry pomace were ground for about 5 minutes in a "Vitamix" brand high shear blender. Next, the materials were sieved using a ROTAP machine to create about 50 grams of material that passed through a US 120 mesh sieve.

The dry grinding and sieve produced sufficient powder to pass through a 120 mesh powder. The powder had a greatly reduced gritty feel when rubbed between fingers.

Example 8

The ability of a "freeze-shear" process to reduce the particle size and functional properties of cranberry and blueberry pomace was evaluated. In the culinary world, a process sometimes called "Paco-Tizing" is used be chefs to create smooth food purees. The process involves cooking of various foods, adding liquid to the food mixture, freezing the mixture, then subjecting to the "Paco-tizing" treatment. A blade is used to mechanically shave off thin shavings of ice from the frozen food—water matrix. The result is often a smooth purees than can be used for various culinary applications. The consistency of the resultant purees is often referred to as "baby-food"

It was discovered that applying this freeze-shear/shave process to a high fiber material creates a modified fiber with improved water sorbtion, texture, and food ingredient useful properties.

Fifty (50) grams each of cranberry pomace (Cran Chile) or blueberry pomace (Givaudan) was hydrated continuously with water in order to create a slurry or paste that could be frozen.

Try #1: 50 g of cold water was added to 50 g of cranberry pomace and mixed in a bowl (stainless steel) with a standard rubber spatula. The pomace immediately absorbed the water fully but did not produce a slurry. Water was added at 50 g increments to understand how much water must be added to make a slurry.

| Cold H$_2$0 to Pomace | Observation |
| --- | --- |
| 0:1 | Dry pomace~70 mesh. Gritty and fibrous. |
| 1:1 | Water absorbs rapidly, pomace does not feel wet. |
| 2:1 | Pomace begins to swell but still dry to touch. |
| 3:1 | Crumb topping consistency. |
| 4:1 | Still crumbly. |
| 5:1 | Mush just begins to form, still too thick for a blender. Transfer to Vitamix. |
| 7:1 | Mixture thick slurry but Vitamix blender cannot continuously mix (no vortex) |
| 8:1 | As more water is added mixture THICKENS → indicates fiber swelling and moisture sorbtion. |
| 10:1 | Mixture still thickening Vitamix still cannot create a vortex. |
| 15:1 | Same as 10:1 except the vortex is created intermittently. |
| 20:1 | Vortex created and continuously sheared for 5 minutes. Mixture appears to thicken somewhat but stabilize after 2-3 minutes of continuous shear. |

Try #2: Hot water (boiling) was used with the same procedure as in try #1 with virtually the same result.

Try #3a: 50 g Blueberry pomace and cold water and required only 10:1 water:pomace to achieve desired consistency.

Try #3b: A batch for freeze-shearing was prepared with a 20:1 water cranberry pomace ratio. In particular, 50 g cranberry pomace added to 500 g cold (20° C.) water in a Vitamix blender (a 10:1 ratio.) Blending on high, a vortex/sustained shearing could not be attained. An additional 100 g cold water (12:1) was added with still no vortex. Another 100 g cold water (14:1) was added and a vortex started and stopped erratically. An additional 100 g cold water (16:1) as added and a vortex began but after a minute, it ceased as viscosity of the blending appeared to increase. A further 100 g cold water (18:1) was added with the same result as the 16:1 ratio—a vortex was created for about 1-1½ minute, but then stopped and the viscosity of the mixture appeared to increase again. A final 100 g cold water (20:1) was added whereby a vortex was created and stayed for 5 minutes on high. After 5 minutes, mixture began to "dry pop" or "splash" as viscosity of mixture still continued to increase. Mixing was stopped.

A small amount of the mixture was spread on a culinary roule rubber mat and dried in a low oven (about 170° F.). After an hour, it was apparent that a film of fiber was forming indicating the fiber was modified enough by the Vitamix process to form a cohesive matrix. Unsheared material did not form a film.

The remaining balance of the mixture was frozen in 1 L stainless steel canisters (for later freeze-shearing) at 16° F. The next day, ~16 hour later, the frozen puree was subject to two cycles of the Paoject shearing process. The result was immediately apparent: a smooth frozen puree resulted. When eaten, the puree exhibited little or no grittiness experienced with the untreated puree/slurry.

Upon thawing at room temperature, a smooth, thick puree with the consistency of dairy pudding was obtained. The pudding had only a slight degree of grittiness on the tongue and a slightly acidic/tart and astringent after taste (due to the acids and polyphenol compounds contained in cranberry pomace).

Continuous hydration and shear of cranberry and blueberry pomace increased viscosity and created film forming ability. Around 20 parts water to 1 part cranberry pomace or 10 parts water to 1 part blueberry pomace was needed to create a fluid that could be continuously sheared in a high shear Vitamix mixer/blender. The unexpected result indicated shear and hydration can be used to slightly modify fruit fiber to create a potentially useful food ingredient. Subsequent "freeze-shearing" created a relatively smooth pudding like product. The Vitamix or freeze-shear process alone did not have the same effect as the combination of the two treatments.

Example 9

Samples Prepared:
A. Naked Juice blue machine fiber enrichment. Blended 15.2 g blueberry pomace that had been freeze-sheared after Vitamix hydration and sheer 1/6=n % s and contained 5 parts H$_2$O 1 part pomace (12% total fiber based on calculation), 186.4 g Naked Juice Blue machine smoothie, and 38.4 g tap water. Thus 15.2 g×0.12 or 1.8 g fiber from pomace blend was prepared by shaking 10 seconds in a Naked Juice bottle. The resulting beverage had scant to no gritty texture.

B. Naked juice blue machine with cranberry pomace blend.

$$150 \text{ g } 20{:}1 \text{ cranberry pomace}\left(=\frac{1 \text{ g pomace}}{21 \text{ g sturry}} \times 150 \times \frac{72 \text{ g fiber}}{\text{g pomace}}\right) =$$

$$5 \text{ g fiber,}$$

25 g sucrose (granulated), 0.34 g citric acid, and 0.16 g malic acid. Resulting blend had low to no gritty texture, low sweetness, and high tartness. Illustrated ability to add excellent source of fiber to a beverage.

C. Formula A above was prepared with 2× blueberry pomace. The blend provided a good source of fiber and some gritty texture.

D. Blended 6 oz of Yoplait blueberry yogurt with 21 g 5:1 blueberry pomace to obtain approximately a good source (2.5 g fiber/serving) fiber. Nice and smooth texture, no grit although flavor balance lost when added to commercial product.

E. Cranberry-fiber "pudding"/thick smoothie as prepared by combining 116 g (20:1) cranberry pomace "pudding," 33 g sucrose, 0.5 g citric acid, 0.3 g malic acid, and 0.2 aspartame. The resulting smoothie had minimal grittiness. The acid and sweetener were balanced for more optimal taste.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method of processing pomace comprising
    obtaining a pomace press cake by extracting juice from a fruit, vegetable, or combinations thereof;
    hydrating the pomace press cake;
    acidifying the pomace press cake with an organic acid;
    micro-grinding the hydrated, acidified pomace press cake to reduce the particle size of the pomace to less than 250 microns.

2. The method of claim 1 comprising reducing the particles size to less than 125 microns.

3. The method of claim 1 comprising reducing the particles size to less than 38 to 125 microns.

4. The method of claim 1 further comprising heating the pomace press cake to at least 70° C. before, during, or after reducing the particle size.

5. The method of claim 1 further comprising heating the pomace press cake with heat generated by the friction of grinding blades during size reduction.

6. The method of claim 1 further comprising acidifying the pomace press cake with citric acid, lactic acid, acetic acid, malic acid, or succinic acid.

7. The method of claim 1 comprising freezing the hydrated pomace cake at a temperature of 0 to −20° C. prior to reducing the particle size.

8. The method of claim 1 further comprising treating the pomace press cake to remove undesired components therefrom.

9. The method of claim 1 further comprising, after micro-grinding the pomace press cake, homogenizing the micro-ground pomace.

10. The method of claim 1 wherein the pomace press cake is obtained from juice extraction from a fruit or vegetable selected from the group consisting of carrot, cranberry, orange, blueberry, tomato, apple, lemons, limes, grapes, strawberries, grapefruits, tangerine, mandarin orange, tangelo, pomelo, celery, beet, lettuce, spinach, cabbage, artichoke, broccoli, brussels sprouts, cauliflower, watercress, peas, beans, lentils, asparagus, onions, leeks, kohlrabi, radish, turnip, rutabaga, rhubarb, carrot, cucumber, zucchini, eggplant, pineapple, peach, banana, pear, guava, apricot, watermelon, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, rowan, gooseberry, pomegranate, persimmon, mango, papaya, lychee, plum, prune, fig, and any combination thereof.

11. The method of claim 1 wherein the pomace press cake is obtained from juice extraction from a fruit or vegetable selected from the group consisting of carrot pomace, orange pomace, cranberry pomace, or mixtures thereof.

12. The method of claim 1 further comprising testing fiber content of the pomace comprising heating the pomace up to 100° C. for a time sufficient for enzyme inactivation and then subjecting the pomace to AOAC analysis.

13. The method of claim 1, wherein the hydrating step further comprising:
    adding water to the pomace press cake.

14. The method of claim 13, further comprising:
    adding sufficient water to the pomace press cake to maintain a vortex in a blender.

* * * * *